US008077170B2

(12) United States Patent
Findel

(10) Patent No.: US 8,077,170 B2
(45) Date of Patent: Dec. 13, 2011

(54) ELECTRONIC PAINTING

(76) Inventor: Matl Findel, Berlin (DE)

( * ) Notice: Subject to any disclaimer, the term of this patent is extended or adjusted under 35 U.S.C. 154(b) by 0 days.

(21) Appl. No.: 12/876,049

(22) Filed: Sep. 3, 2010

(65) Prior Publication Data

US 2010/0332244 A1 Dec. 30, 2010

Related U.S. Application Data

(60) Division of application No. 11/451,682, filed on Jun. 12, 2006, now abandoned, which is a continuation-in-part of application No. PCT/DE2004/002759, filed on Dec. 10, 2004.

(30) Foreign Application Priority Data

Dec. 11, 2003 (DE) ................................ 103 58 633

(51) Int. Cl.
*G06F 3/038* (2006.01)
*G09G 5/00* (2006.01)

(52) U.S. Cl. ......................... 345/211; 345/212; 705/1.1

(58) Field of Classification Search .................. 345/204, 345/211–213; 705/1.1, 4
See application file for complete search history.

(56) References Cited

U.S. PATENT DOCUMENTS 4,757,470 A * 7/1988 Bruce et al. .................. 345/634
4,855,725 A 8/1989 Fernandez et al.
5,646,650 A * 7/1997 Miller et al. ................. 345/179
2003/0093287 A1* 5/2003 Lowery ........................... 705/1

FOREIGN PATENT DOCUMENTS

| | | | |
|---|---|---|---|
| CN | 1 355 472 | A | 6/2002 |
| EP | 1 178 460 | A | 2/2002 |
| WO | WO 02/069312 | A2 | 9/2002 |

OTHER PUBLICATIONS

International Search Report.

* cited by examiner

*Primary Examiner* — Kimnhung Nguyen
(74) *Attorney, Agent, or Firm* — Sughrue Mion, PLLC

(57) ABSTRACT

An electronic painting comprising a display unit which is provided with a display element, an energy supply and a control unit, having a rigidly installed, non-replaceable storage medium, wherein non-changeable information which is used to control the display unit is stored. The electronic painting assumes the functions of a traditional painting which represents only one idea and is unique by virtue of the fact that the content of the storage medium is constant. The painting has a flat display which is also suitable for mounting on walls as traditional paintings. The electronic painting can also be provided with housing frame. Advantageously, a current or battery-driven electronic painting can also represent dimensions and time. The storage medium may contain a determined sequence of electronically generated images or a video, and movements can, for example, also be directly represented. Stored sound sequences can also be emitted via optional loud speakers.

3 Claims, 7 Drawing Sheets

ELECTRONIC PAINTING

CROSS REFERENCE TO RELATED APPLICATIONS

This Application is a divisional of U.S. application Ser. No. 11/451,682 filed Jun. 12, 2006; which is a continuation in part of PCT Application PCT/DE04/02759 09/964,129 filed Dec. 10, 2004. These related applications are fully incorporated herein by reference for all purposes.

BACKGROUND OF THE INVENTION

The invention relates to an electronic painting having a display unit with at least one display element, a power supply and a control unit for driving the display unit.

Paintings for depicting art have been known for centuries. In the case of oil paintings, for example, abstract or figurative depictions are applied to canvas using oil paints and the canvas, which is usually surrounded by a frame, is fixed to a wall of a room. Paintings are unique items which, depending on the artist, may have a very high material value in addition to the non-material value. They are portable and "function" independently, that is to say they speak for themselves alone. The disadvantage of conventional paintings is that they cannot depict the time dimension. A painting only ever shows the same image, the same scene.

Displays based on liquid crystals, light-emitting diodes, organic light-emitting diodes or plasma displays are also known. They are distinguished, for example, by a small device depth since a cathode ray tube of conventional screens is not required. Such displays therefore save space and are also suitable, for example, for being fitted to walls. Further advantages of flat panel displays are their low weight, their energy efficiency and their various uses. Flat panel displays are used, for example, in mobile telephones, as computer monitors or TV screens and are also suitable for large-format applications.

It is also known that flat panel displays are usually either used in a form integrated in electronic devices such as cash machines or mobile telephones or else are connected to electronic devices via a transmitting and receiving apparatus. When flat panel displays are used as TV screens, the flat panel display is provided with the images to be displayed via a cable. However, data which are displayed on the display may also be transmitted without cables via radio. Displays are suitable for displaying an individual image as well as for displaying moving images or videos. The applications have the feature in common that the data which are displayed on the display can be changed. Another fixed or moving image can thus be displayed on the flat panel display, for example by changing the television channel or inserting a DVD. However, the disadvantage of this is that displays interact with an external storage medium or a data transmission unit and are not intended to exclusively display precisely one content.

BRIEF DESCRIPTION OF THE INVENTION

In view of the above, an inventive electronic painting including a display unit which has at least one display element, a power supply and a control unit for driving the display unit has a storage medium which is permanently installed, cannot be exchanged and stores information which cannot be changed and is intended to be displayed by the display unit.

One particular advantage of the invention resides in the fact that the content of the storage medium cannot be changed. An electronic painting according to an embodiment of the present invention can therefore assume the function of a conventional painting which likewise displays only one content and is a unique item. In other words, an electronic painting according to an embodiment of the present invention is adapted to display precisely one electronically generated image or precisely one sequence of electronically generated images to be displayed in the form of an electronic painting. In addition, however, a plurality of electronic paintings may also display the same memory content on the display for industrial mass production. In this form, the electronic paintings would correspond to conventional prints. Duplicates of electronic paintings may also have the same memory content.

Another advantage results from the fact that the electronic painting is implemented using a flat panel display which is also suitable for being fitted to room walls in a similar manner to conventional paintings. In this case, the electronic painting may also be provided with a housing frame, thus further increasing the visual similarity.

A current-operated or battery-operated electronic painting may also advantageously depict the time dimension. If the storage medium comprises not only precisely one electronically generated image but a defined sequence of electronically generated images or videos, movements may also be directly depicted, for example.

Another advantage of the electronic painting also results from the ability to provide electronic paintings with loudspeakers for the purpose of providing the electronically generated image or image sequence with sounds.

The inventive electronic painting advantageously does not require a connection to an external data device. During battery operation, in particular, the electronic painting independently functions in a similar manner to a conventional painting without a visually apparent connection to another device.

Further to the above, a method of doing business is provided, the method including the steps of: providing an electronic painting comprising a display unit which has at least one display element, a power supply and a control unit for driving the display unit, the electronic painting having a storage medium which is permanently installed, cannot be exchanged and stores information which cannot be changed and is intended to be displayed by the display unit; storing display information on the storage medium, the display information comprising an electronic image or a sequence of electronic images; and providing the electronic painting to customers.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
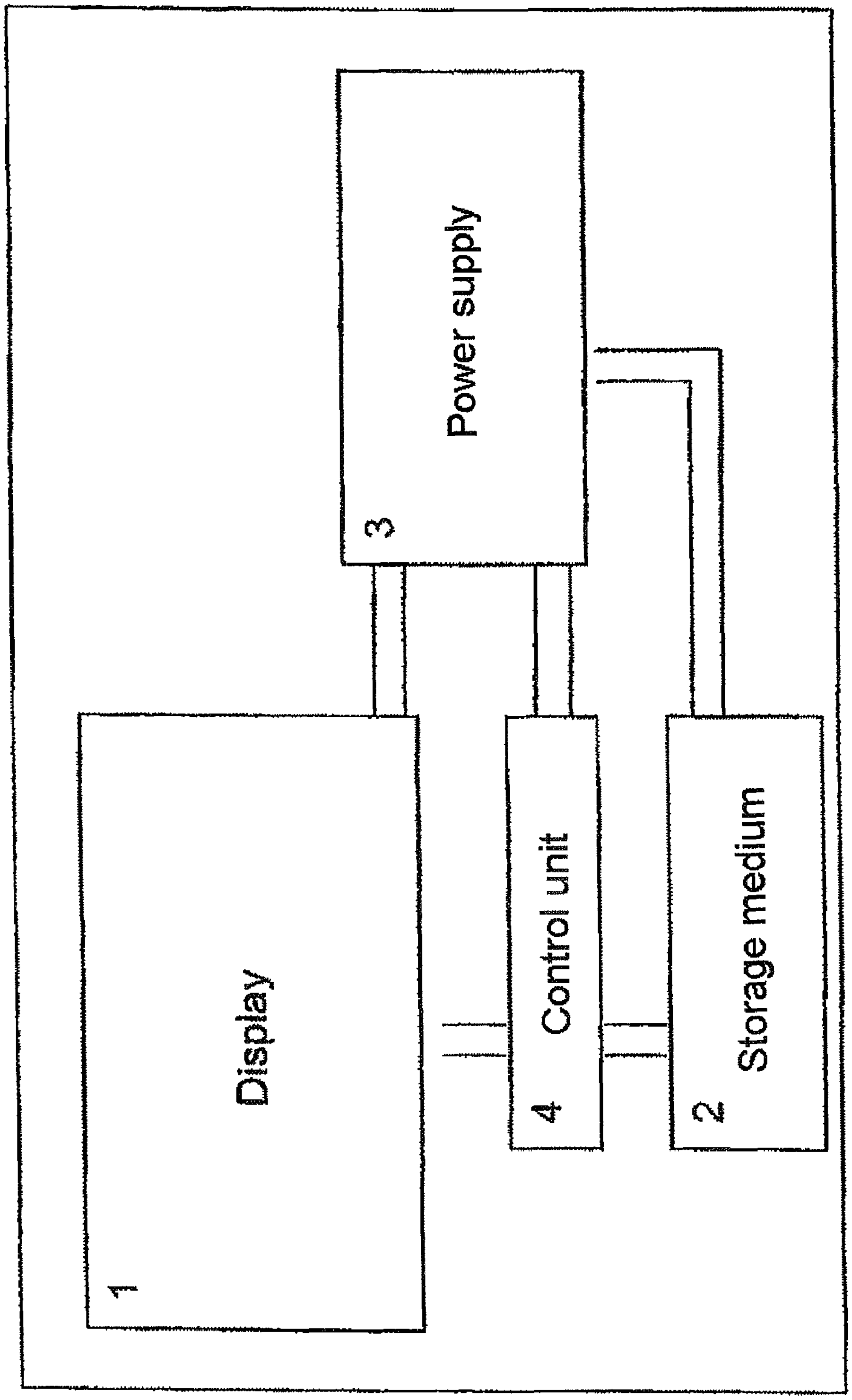
FIG. 1: shows a diagrammatic illustration of a basic circuit diagram of an exemplary embodiment of the inventive electronic painting.

FIG. 1 shows a diagrammatic illustration of a basic circuit diagram of an exemplary embodiment of the inventive electronic painting. The electronic painting comprises a display unit 1 which has at least one display element, a storage medium 2, a power supply 3 and a control unit 4 for driving the display unit 1 using the data which are stored in the storage medium 2. The power supply 3 supplies the storage medium 2, the control unit 4 and the display unit 1 with power. The power supply 3 preferably comprises a combination of a battery compartment for operation with batteries or rechargeable batteries and a power supply connection. In this case, the mains supply is effected using a cable. The storage medium 2 is connected, via the control unit 4, to the display unit 1 for the purpose of displaying the content of the storage medium 2. In this case, the connection is preferably electrical. Apart from the mains connection, the inventive electronic painting does not require any other connection. For example, a unit for receiving data from the outside, whether via cable or radio, is thus not required. The data which are displayed on the display unit 1 in the form of an electronic painting are integrated in the inventive electronic painting. The electronic painting thus functions without receiving data from the outside.

According to an embodiment of the present invention, the content stored on storage medium 2, e.g. an artistic image or an artistic video, is protected against copying. For example, the content may be encrypted by any suitable encryption method known in the art. The encrypted information can be decoded, for example, by control unit 4 or a specific decoder (not shown) provided in the electronic painting. The encryption key may be the same for all electronic paintings or may be individually generated for every electronic painting. In the latter case, the information to be displayed is individually encrypted with the individual key when being copied onto the storage medium 2. Alternatively or additionally, the information stored on storage medium 2 may be protected by a digital rights management (DRM) system. Any suitable DRM system known in the art may be applied to the electronic painting.

Figure 5:
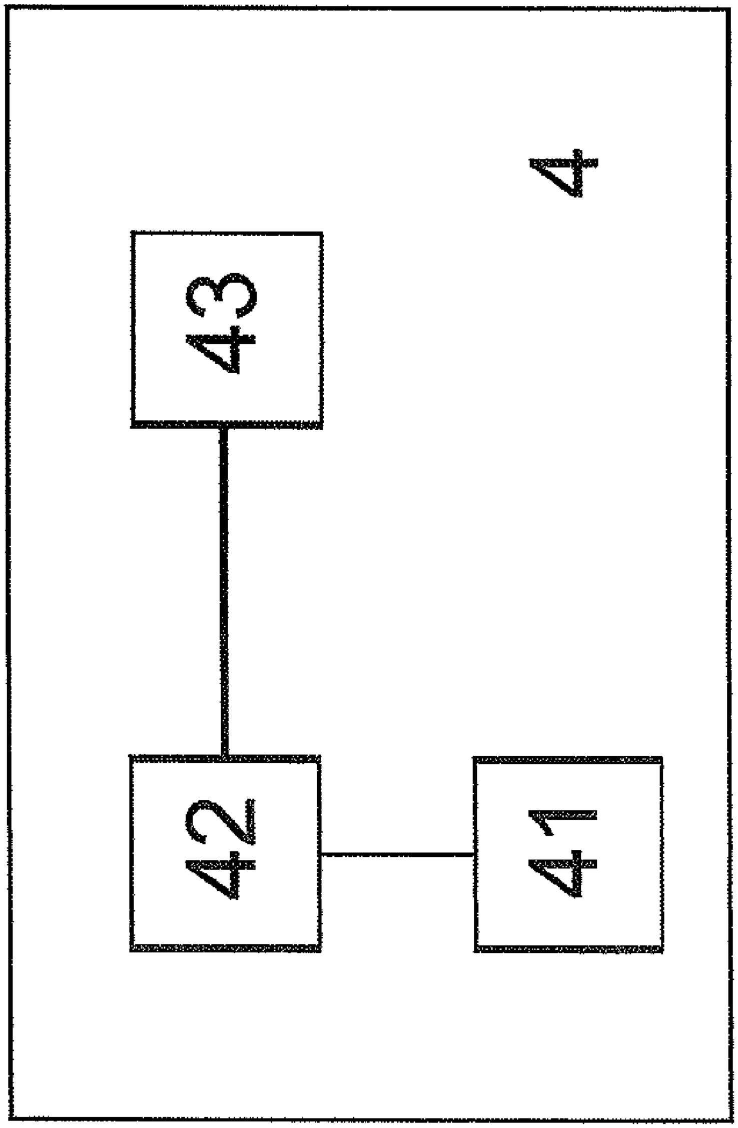
FIG. 5: shows a block diagram of a control unit according to an embodiment of the present invention.

FIG. 5 shows a block diagram of a control unit 4 according to an embodiment of the present invention. Therein, the electronic painting includes a clock 41. Typically, the clock 41 will be integrally formed with the control unit 4. For example, the control unit 4 includes an integrated circuit which has a clock 41. The clock 41 can be adapted to measure the time lapsed since a certain date. For example, the clock 41 may be adapted to measure the time lapsed since display information was stored on the storage medium 2. Optionally or alternatively, the clock 41 may be adapted to measure the time lapsed since the electronic painting was sold or leased to a customer. According to another embodiment of the present invention, the electronic painting may include an ON/OFF switch (not shown) and clock 41 may be adapted to measure the time lapsed since the electronic painting was switched ON. Especially, the electronic painting may include a memory 42 in which the total time of the electronic painting being switched ON is stored, i.e. the time measured by clock 41 is added up in memory 42. The electronic painting may further include a comparator 43 connected to memory 42. The comparator 43 checks whether the total duration of operation of the electronic painting exceeds a predetermined amount, e.g. a leasing time. In this case, comparator 43 can send a signal to display unit 1 and/or power supply 3 to terminate displaying the display information stored on storage medium 2. Furthermore, clock 41 can be adapted so that it turns ON and OFF the electronic painting at certain day times. Thus, energy can be saved, e.g. for electronic paintings located in business areas during night time.

Figure 2:
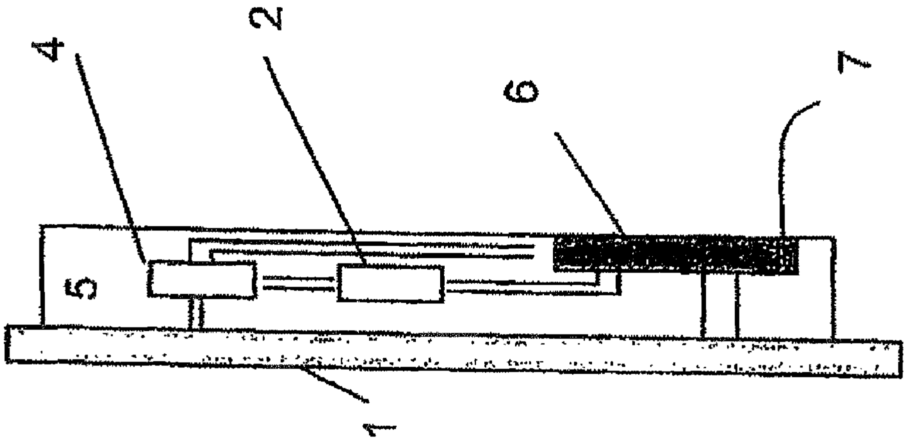
FIG. 2: shows a side view of an exemplary embodiment of the inventive electronic painting with a housing.

FIG. 2 illustrates a side view of the inventive electronic painting. In this case, the electronic painting 1 is implemented in the form of a flat panel display. In one embodiment, the flat panel display is a plasma display. However, it may also be a display based on LED, OLED, LCD or TFT display elements. In particular, the display may also be a thin film of display elements. According to another embodiment, the display element 1 is flexible. According to even a further embodiment, the display element 1 is made of electronic paper. A housing 5 is preferably fitted behind the display unit 1. The storage medium 2 is situated in the housing 5. The storage medium 2 is a read only memory which is retained even after the power supply has been disconnected. It is preferably implemented using a hard disk, a microdrive, a memory stick, a compact flash memory, an optical memory, a magnetic card, a CD or a memory card. The storage medium 2 is arranged in such a manner that it is not directly accessible from the outside or cannot be opened and it is thus ensured that the data which are displayed on the display unit 1 cannot be changed. In this case, the data may comprise a sequence of electronically generated images or correspond only to a single electronically generated image. The inability to change the data is a prerequisite for creating a unique item and an article which has both non-material and material value. A power supply 3 comprising a battery compartment 6 and a mains supply 7 is also provided in the housing 5. However, the power may also be supplied using a battery or the mains alone. In this case, the housing 5 needs to be kept as flat as possible so that the electronic painting can be mounted on the wall like a conventional painting. The battery compartment 6 is fitted in the housing such that it is accessible from the outside.

Figure 3:
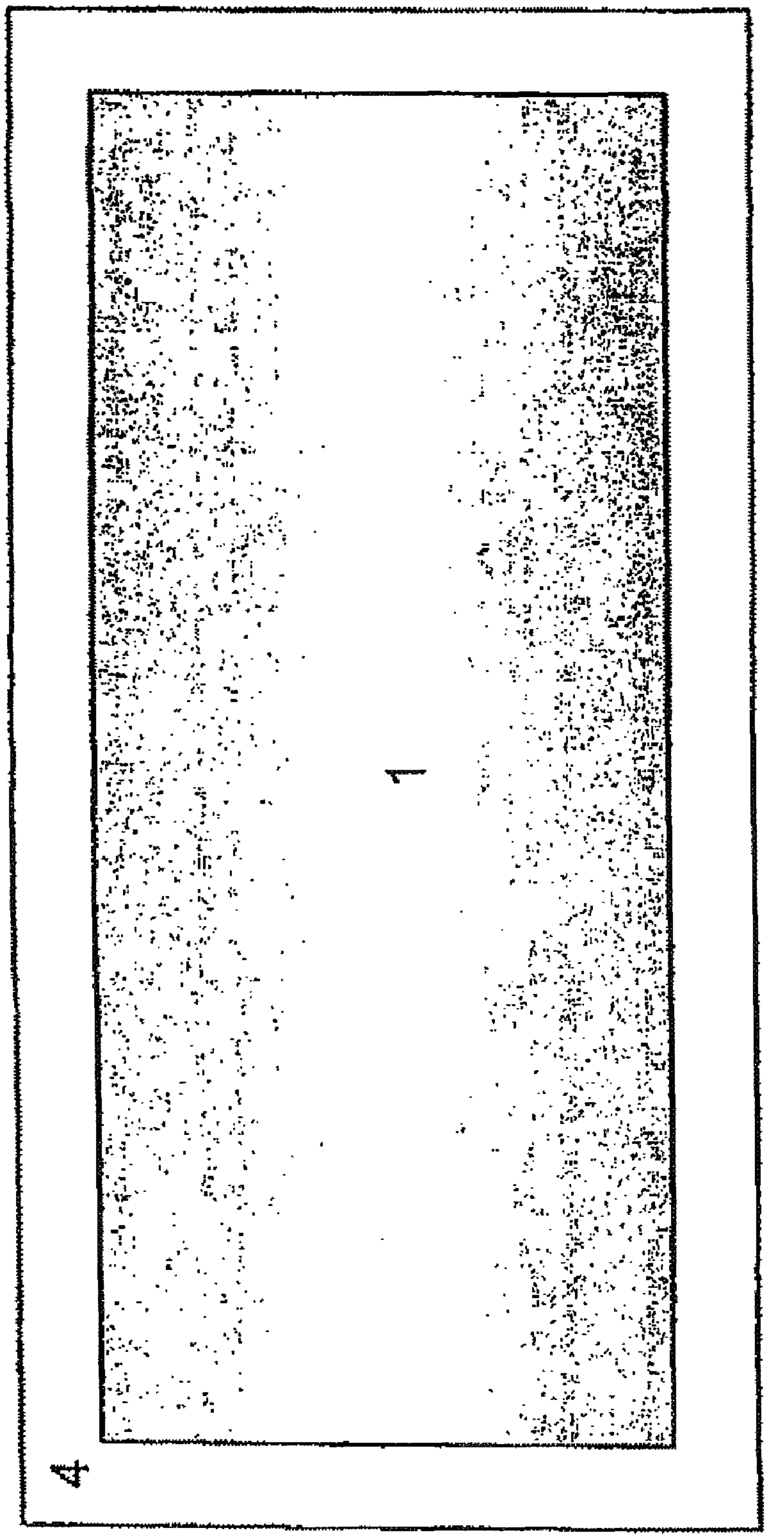
FIG. 3: shows a front view of an exemplary embodiment of the inventive electronic painting with a housing.

FIG. 3 shows a front view of an exemplary embodiment of the inventive electronic painting. In this embodiment, the housing 5 is formed around the display unit 1. This gives the visual impression of a frame around the display unit 1, thus increasing the similarity to a conventional painting.

Figure 4:
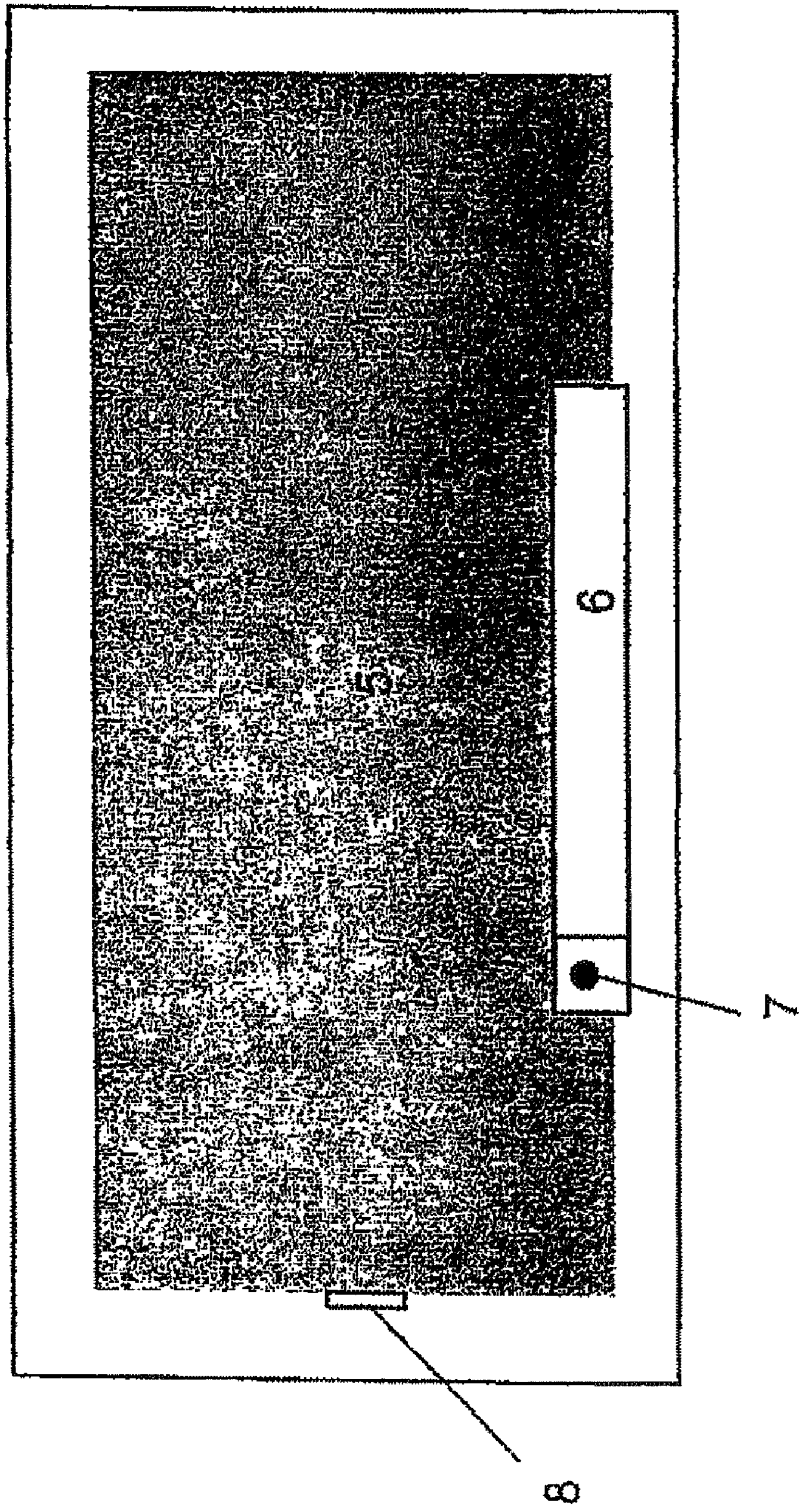
FIG. 4: shows a rear view of an exemplary embodiment of the inventive electronic painting with a housing.

FIG. 4 shows a rear view of an exemplary embodiment of the inventive electronic painting. Only the battery compartment 6 and the mains connection 7 are accessible on the rear wall; the storage medium 2 is integrated in the housing 5 and is not accessible. A switch 8 for switching the electronic painting on and off may be fitted to the side of the housing 5.

In another embodiment, the switch 8 is implemented in the form of a dimmer. Furthermore, the dimming function may also be implemented automatically via a control unit with a connected photodetector, with the result that the brightness of the electronic painting is automatically matched to the lighting conditions.

In another exemplary embodiment, the inventive electronic painting has loudspeakers for reproducing sound sequences which are stored on the storage medium 2.

In another refinement, the power may also be supplied by photoelectric elements, e.g. solar cells, which are fitted to the housing 5 of the electronic painting, in combination with a rechargeable battery. This embodiment allows power supply from the outside via cables to be dispensed with, thus bringing the visual impression of the electronic painting more into line with that of a conventional painting.

Figure 6:
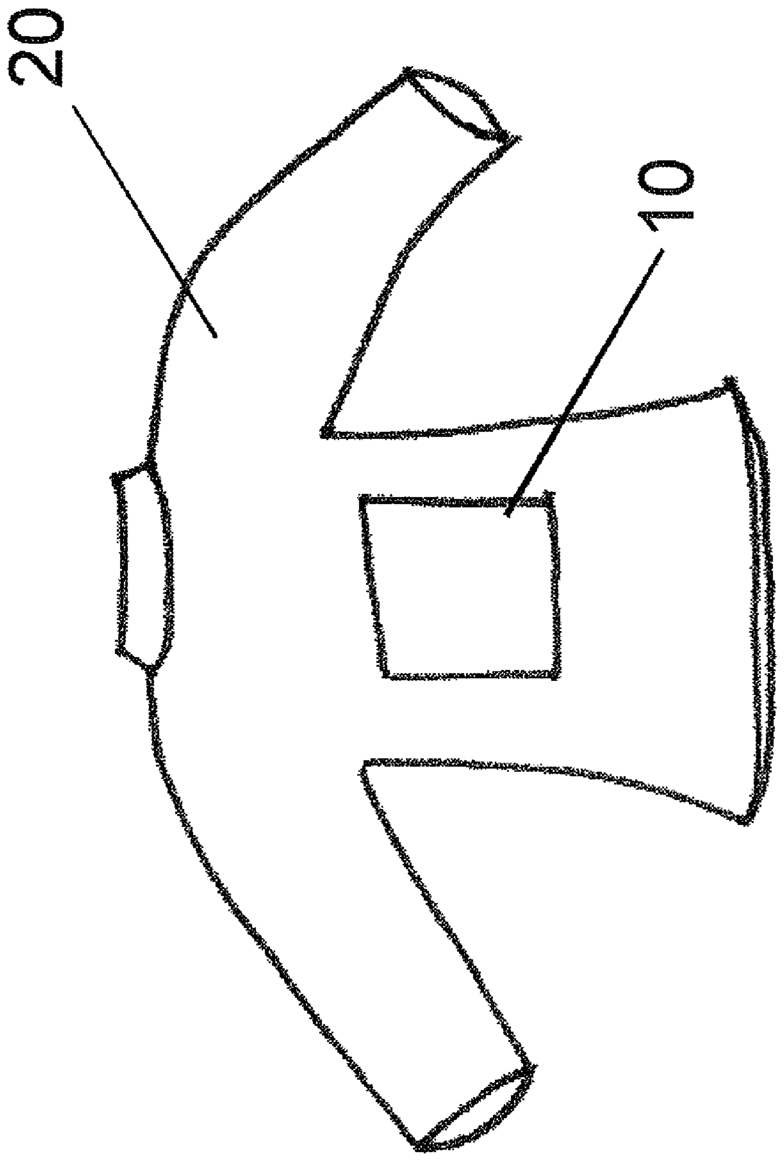
FIG. 6: shows another embodiment of the present invention.

FIG. 6 shows another embodiment of the present invention. Therein, an electronic painting 10 is attached to or integrated in an article of clothing 20. Typically, an electronic painting for a garment is made has a flexible display. Alternatively, also more rigid displays can be used if the size of the display is not too large.

Figure 7:
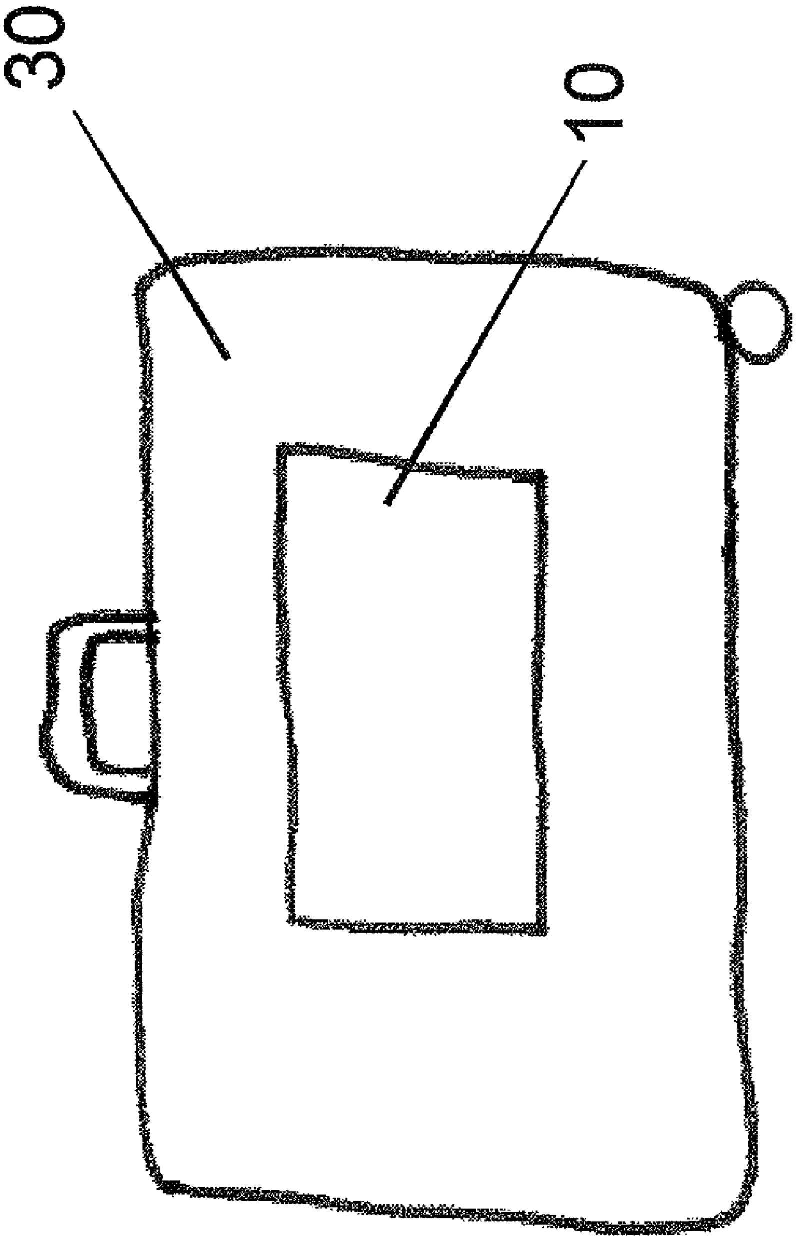
FIG. 7: shows a further embodiment of the present invention.

FIG. 7 shows a further embodiment of the present invention. Therein, the electronic painting 10 is attached to or integrated in a suitcase 30. Similarly, electronic painting 10 may also be integrated or attached to a bag, a briefcase or a wallet.

According to another aspect of the present invention, a method of doing business is provided. In this method, an electronic painting according to any of the above described embodiments is provided. Then, display information, e.g. an artistic image, a sequence of artistic images or an artistic video, is stored on the storage medium in electronic form. Typically, the image information is encrypted either with a general key or with a key individually created for the electronic painting. Additionally or alternatively, the image information can be protected against copying by a DRM system. Finally, the electronic painting is provided to customers. This may be done by sale, rent or lease.

Since the information stored on the storage medium cannot be altered or exchanged, the publisher of the electronic painting has full control over the use of the image content stored thereon. Thus, the publisher can control the number of electronic paintings displaying the same content. This number may be one, i.e. the electronic painting is a unique piece of art, or may be a limited number, e.g. 50, so that these electronic paintings are similar to art prints. To limit the number of electronic paintings displaying the same content, the original display information can be destroyed after copying it a predetermined number of times. Additionally or alternatively, also the keys for encrypting the information may be destroyed. Alternatively, the original display information can be securely stored, e.g. in a safe or the like, so that is still available for refreshing the display information in case display information is lost on the storage medium of an electronic painting. For example, an after-sale-service may be established for ensuring sound operation of the electronic paintings. However, access to the original display information is limited to the publisher of the electronic painting so that he has the full control over the content. Furthermore, the publisher of an electronic painting may decide to successively publish several editions of a certain content.

According to another aspect of the present invention, instead of selling the electronic painting can be leased to a customer for a certain period of time. In this case, the electronic painting may be provided with a clock for measuring leasing time lapsed. If the predetermined leasing time has lapsed, the electronic painting can be automatically switched off. Optionally, the electronic painting may be provided with an ON/OFF switch and a clock measuring only the times when the electronic painting is switched ON. In this case, the electronic painting may be leased for a certain amount of ON time. This is especially interesting for business areas which are only frequented during business hours.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

LIST OF REFERENCE SYMBOLS

1 Display unit
2 Storage medium
3 Power supply
4 Control unit
5 Housing
6 Battery compartment
7 Mains supply
8 On/off switch
10 Electronic Painting
20 Clothing
30 Suitcase
41 Clock
42 Memory
43 Comparator

What is claimed is:

1. A method of doing business, comprising the steps of:

(a) providing an electronic painting comprising a display unit which has at least one display element, a power supply and a control unit for driving the display unit, the electronic painting having a storage medium which is permanently installed, cannot be exchanged and stores information which cannot be changed and is intended to be displayed by the display unit;

(b) storing display information on the storage medium, the display information comprising an electronic image or a sequence of electronic images; and (c) providing the electronic painting to customers;

wherein the electronic painting is leased to customers for a certain period of time;

wherein the electronic painting is provided with a clock for measuring leasing time lapsed, and wherein the electronic painting is automatically switched off when a predetermined leasing time has lapsed.

2. The method as claimed in claim 1, wherein the original display information is destroyed after copying it to a predetermined number of electronic media.

3. The method as claimed in claim 1, wherein the original display information is securely stored for refreshing the display information, and wherein access to the original display information is limited to the publisher of the electronic painting.

* * * * *